（12） United States Patent
Falk

(10) Patent No.: US 9,959,393 B2
(45) Date of Patent: May 1, 2018

(54) METHOD FOR TESTING TAMPER PROTECTION OF A FIELD DEVICE AND FIELD DEVICE HAVING TAMPER PROTECTION

(75) Inventor: Rainer Falk, Poing (DE)

(73) Assignee: Siemens Aktiengesellschaft, München (DE)

( * ) Notice: Subject to any disclaimer, the term of this patent is extended or adjusted under 35 U.S.C. 154(b) by 767 days.

(21) Appl. No.: 14/111,276

(22) PCT Filed: Apr. 3, 2012

(86) PCT No.: PCT/EP2012/056025
§ 371 (c)(1),
(2), (4) Date: Oct. 11, 2013

(87) PCT Pub. No.: WO2012/139923
PCT Pub. Date: Oct. 18, 2012

(65) Prior Publication Data
US 2014/0032171 A1  Jan. 30, 2014

(30) Foreign Application Priority Data
Apr. 12, 2011  (DE) .................. 10 2011 007 200

(51) Int. Cl.
G06F 21/00 (2013.01)
G06F 21/44 (2013.01)
G06F 21/87 (2013.01)
G08B 29/04 (2006.01)

(52) U.S. Cl.
CPC .............. G06F 21/00 (2013.01); G06F 21/44 (2013.01); G06F 21/87 (2013.01); G08B 29/046 (2013.01)

(58) Field of Classification Search
CPC .......... G06F 21/00; G06F 21/44; G06F 21/87; G08B 29/046
USPC ................ 702/115, 118, 132, 182; 356/73.1; 382/141; 714/194
See application file for complete search history.

(56) References Cited

U.S. PATENT DOCUMENTS 7,685,438 B2    3/2010 Knudsen
2008/0025594 A1 1/2008 Metzger
2008/0192240 A1 8/2008 Tucker et al.

FOREIGN PATENT DOCUMENTS

EP    2 211 289 A1    7/2010
WO   WO 2007/031908 A2   3/2007
WO   WO 2008/102282 A2   8/2008

OTHER PUBLICATIONS

German Office Action dated Dec. 9, 2011 for corresponding German Patent Application No. DE 10 2011 007 200.4 with English translation.

(Continued)

Primary Examiner — John H Le
(74) Attorney, Agent, or Firm — Lempis Summerfield Katz LLC

(57) ABSTRACT

Testing tamper protection of a field device includes arrangement of at least one test element in the material of a housing of the field device. The test element is supplied with a first test signal, and the first test signal is measured for determining a physical fingerprint. The physical fingerprint is measured, and the test element is supplied with a second test signal. The second test signal is measured, and the second test signal is compared with the physical fingerprint. If the second test signal deviates from the physical fingerprint, a tamper signal is output.

13 Claims, 2 Drawing Sheets

(56) References Cited

OTHER PUBLICATIONS

International Search Report and Written Opinion of the International Searching Authority dated Jul. 19, 2012 for corresponding PCT/EP2012/056025.
Secure your Embedded Devices, Atmel, http://www.atmel.com/dyn/resources/prod_documents/doc6528.pdf, pp. 1-18, 2011.
FlexGuard® FG-1625SN V-Plex Glassbreak Detector Installation Instructions, http://library.ademconet.com/MWT/fs2/7/5877.pdf, Honeywell, pp. 1-2, 2011.
P. Tuyls, et al., "Strong Authentication with Physical Unclonable Functions," Security, Privacy, and Trust in Modern Data Management, pp. 133-148, 2007.
J. Guajardo, et al., "Anti-counterfeiting, key distribution, and key storage in an ambient world via physical unclonable functions," Information Systems Frontiers, vol. 11, No. 1, pp. 19-41, 2008.
J. Guajardo, et al., "Physical Unclonable Functions and Public-Key Crypto for FPGA IP Protection," Field Programmable Logic and Applications, International Conference on IEEE, pp. 189-195, 2007.

METHOD FOR TESTING TAMPER PROTECTION OF A FIELD DEVICE AND FIELD DEVICE HAVING TAMPER PROTECTION

The present patent document is a § 371 nationalization of PCT Application Serial Number PCT/EP2012/056025, filed Apr. 3, 2012, designating the United States, which claims the benefit of DE 10 2011 007 200.4, filed on Apr. 12, 2011. The entire contents of these documents are hereby incorporated by reference.

BACKGROUND

The present embodiments relate to testing tamper protection of a field device and to a field device having tamper protection.

Field devices, for example in the form of points, signals, or barriers for railroad crossings, etc., are usually connected to a signal tower or a control center. Field devices in the form of signaling systems are connected to a corresponding signal tower to control rail traffic, for example by temporarily freeing or blocking a particular section by the signaling system. In order to enable secure communication between the field device and the control center, the field device stores a cryptographic key that is used to encrypt the interchange of data between the field device and the control center.

In order to make it difficult for an attacker to read or manipulate this cryptographic key, hardware security integrated circuits may be used. These circuits may store cryptographic keys and may carry out cryptographic operations. These integrated circuits have sensors, for example on the integrated circuit itself, in order to detect unauthorized opening of the integrated circuit. Such a hardware security integrated circuit is, for example, the AT98 integrated circuit from Atmel, the data sheet for the AT98 may be retrieved from: http://www.atmel.com/dyn/resources/prod_documents/doc6528.pdf.

Furthermore, in the field of fire alarms or theft/intrusion detectors switches may be used that detect the opening of a respective housing or detect removal of the respective detector, for example by unscrewing it from a wall or the like. Such a switch is, for example, the Ademco 5870API model from Honeywell, the data for which may be retrieved from http://library.ademconet.com/MWT/fs2/7/5877.pdf.

Magnetic particles may be embedded in a protective layer on an integrated circuit to protect the cryptographic key. An example of this is shown in U.S. Pat. No. 7,685,438. These magnetic particles may be detected by sensors and may be used to derive and provide a cryptographic key. If the protective layer is removed, the information needed to provide the key is also destroyed, with the result that the integrated circuit may no longer communicate in encrypted fashion. This deactivates the integrated circuit itself.

Evaluation of an optical waveguide may also be used to detect physical manipulation of the optical waveguide. One such approach is illustrated in US Patent Application Publication 2008/192240.

SUMMARY AND DESCRIPTION

The scope of the present invention is defined solely by the appended claims and is not affected to any degree by the statements within this summary.

One object of the present embodiments is to provide a method for testing tamper protection of a field device and a field device having tamper protection, that may be carried out and produced, respectively, in a simple and reliable manner and provides a high degree of tamper protection.

A method for testing tamper protection of a field device, is presented which may include the following acts: arrangement of at least one test element in a sheath of the field device, application of a first test signal to a test element, measurement of the first test signal in order to determine a physical fingerprint, storage of the physical fingerprint, application of a second test signal to the test element, measurement of the second test signal, and comparison of the second test signal with the physical fingerprint and, if the second test signal differs from the physical fingerprint, output of a tamper signal.

A method for testing if a signal has been tampered with is presented. The method may include a sheath, at least one test element that is arranged in the sheath, at least one test device for emitting and/or receiving a test signal for the test element, at least one interface for transmitting the test signal, the test device being designed to compare a second test signal with a physical fingerprint that is defined using a first test signal and to output a tamper signal if the second test signal differs from the physical fingerprint.

One of the advantages achieved by the above listed methods is a high degree of tamper protection. Furthermore, the methods provide simple and cost-effective tamper protection. In addition, maintenance of the field device is considerably simplified. Finally, the field device may also be easily provided with the tamper protection since a filigree grid film that is difficult to handle is not used as the tamper protection.

The at least one test element may be advantageously arranged inside the sheath by a random process or a pseudorandom process. By arranging the at least one test element by a random process or pseudorandom process, a so-called physically non-copyable function may be implemented at least in a pseudorandom manner since the at least one test element is arranged and/or formed in each housing inside the material of the housing in different ways. If a plurality of test elements are arranged, said elements may provide a physically non-copyable function, for example, solely as a result of pseudorandom inhomogeneities during the production process of the sheath, with the result that said elements are distributed in a unique manner in the sheath. In this case, unique means that, if a plurality of sheaths are produced in a pseudorandom manner, each sheath per se has a unique physical fingerprint.

The first and/or second test signal may be provided in the form of a galvanic, magnetic, optical, thermal, electrical and/or electromagnetic signal. The advantage achieved in this case is that the test signal may therefore be easily configured to respective conditions, for example to the field device. In addition, in order to increase the security, it is possible to also use a plurality of different test signals, for example a thermal test signal and an optical test signal in order to obtain a physical fingerprint.

An item of information relating to the physical fingerprint may be stored on the field device and/or in a database. This makes it possible to increase the security even further by virtue of the information relating to the physical fingerprint being stored, for example, both on the field device and in a database, with the result that the physical fingerprint stored on the field device and the database information relating to the physical fingerprint are compared. The field device then uses the measurements performed with the second test signal to determine whether the physical fingerprint matches the stored physical fingerprint. This makes it possible to detect physical manipulation. Alternatively or additionally, additional information relating to the physical fingerprint may also be stored in the database in order to be able to carry out additional tests in the event of an incomplete physical fingerprint or when possible physical manipulation of the field device is suspected. In this case, the additional information may be present only in the database.

The sheath may be produced by potting. This makes it possible to produce the sheath in a particularly simple manner. In addition, at least one test element may be easily arranged in the sheath in a random or pseudorandom manner.

The sheath may be produced in layers. This makes it possible, for example, to arrange different test elements in different layers of the sheath. If, for example, the test elements are in the form of magnetic, electrical, dielectric or similar particles, the test elements may be arranged, for example, in a randomly distributed manner, in respective layers, for example by spreading. In addition, it is possible to inject the particles into a still liquid potting compound of the sheath in different directions and/or at different speeds. This makes it possible to provide a unique physical fingerprint. In addition, it is possible to also provide an insulating layer that is used, for example, to avoid undesirable influencing of signal transmissions of electrical conductor tracks in the field device or on a carrier, for example a printed circuit board, of the field device.

A plurality of test elements may be randomly arranged in the field device inside the material of the housing using a predefined random process or pseudorandom process. By arranging the test elements via a random process or pseudorandom process, a so-called physically non-copyable function may be implemented at least in a pseudorandom manner since the at least one test element is arranged and/or formed in each housing inside the material of the housing in different ways. If a plurality of test elements are arranged, said elements may provide a physically non-copyable function, for example, solely as a result of pseudorandom inhomogeneities during the production process of the sheath, with the result that said elements are distributed in a unique manner in the sheath. In this case, unique means that, if a plurality of sheaths are produced in a pseudorandom manner, each sheath per se has a unique physical fingerprint.

The at least one test element may be in the form of at least one electrical line in a field device. The advantage achieved in this case is that a test element is therefore provided in a simple manner. The test element may also be easily arranged in a random manner in the material of the housing.

The test device of the field device may include at least one contact element that is designed to interact with the test element in order to determine a physical fingerprint. Such contact elements may be in the form of a signal output and/or a signal input, for example. A test signal may therefore be output at one or more contact areas and received via one or more contact areas. The high combinational number of test possibilities enabled in this manner via different contact areas makes it possible to reliably determine a physical fingerprint for tamper protection.

BRIEF DESCRIPTION OF THE DRAWINGS

Some non-limiting examples of embodiments are described below with reference to the accompanying drawings, in which.

DETAILED DESCRIPTION

Figure 1:
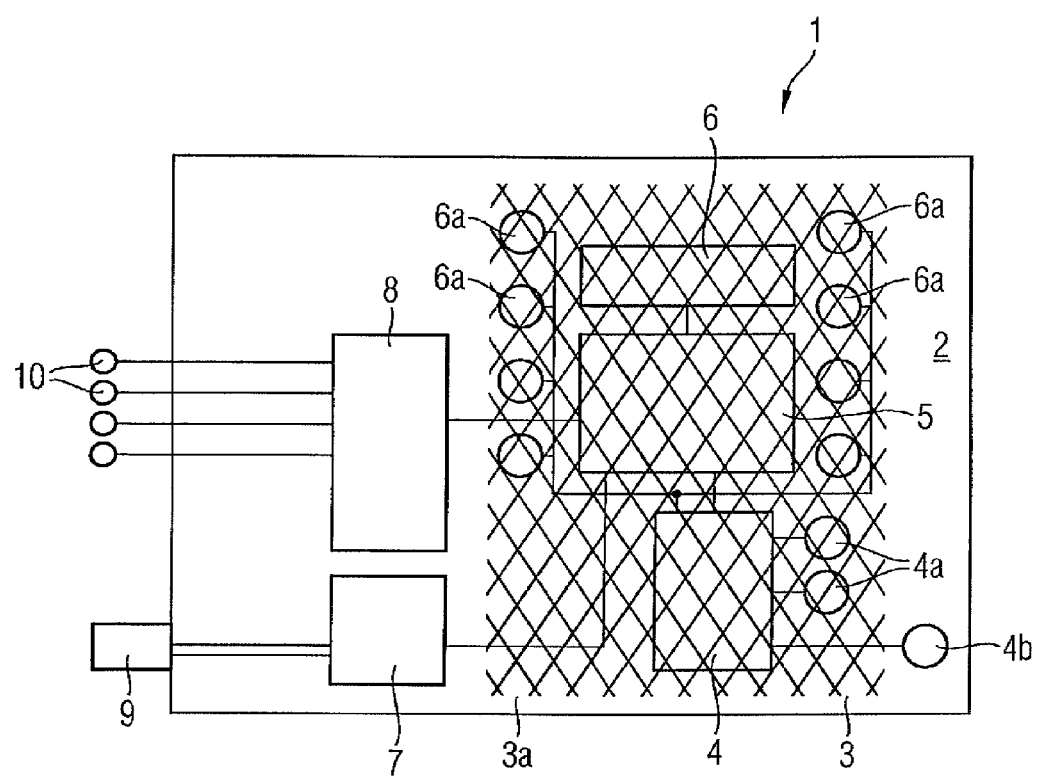
FIG. 1 depicts a field device according to an embodiment.

In FIG. 1, reference symbol 1 denotes a field device. In this case, the field device is a carrier 2 on which a tamper protection device 4 is arranged. The tamper protection device is connected to inner tamper sensors 4a and outer tamper sensors 4b. The tamper protection device 4 is also connected to a control computer 5 in the form of a CPU. The CPU 5 is connected to a configuration memory 6, a network module 7 and an input/output unit 8. In this case, the network module 7 may be provided with an interface 9 for interchanging data with a control center. In this case, the interface 9 may be in the form of an Ethernet interface, for example. The input/output unit 8 is also connected to sensors and/or actuators 10 that may be actuated via the field device 1, for example. If the field device 1 is in the form of points, for example, the respective adjustment of the points 1 may be actuated using the input/output unit 8 and the final controlling elements or actuators 10 connected thereto. A sheath in the form of a potting compound 3 may also be arranged. The sheath substantially completely encompasses the tamper protection device 4, the CPU 5, the configuration memory 6, the contact areas 6a and the inner tamper sensors 4a. Letter elements in the form of electrical lines 3a are randomly arranged in the potting compound 3 according to FIG. 1. The electrical lines are connected to respective contact areas 6a.

Test signals maybe provided via the contact areas 6a using the tamper protection device 4 which may include different currents, voltages, frequencies and/or signal waveforms. As a result of the randomness when arranging the electrical lines 3a in the potting compound 3, a characteristic physical fingerprint of the potting compound 3 and therefore of the field device 1 becomes possible. A physical fingerprint may be created by virtue of the tamper protection device 4 creating a physical fingerprint using different test signals. This physical fingerprint may be stored on the field device 1 in the configuration memory 6 and/or on a background system (e.g., a database) that may be connected to the CPU 5 via the interface 9 for the purpose of interchanging data.

If an attacker now attempts to manipulate the field device 1 by attempting to directly read the configuration memory 6, one possible procedure of the attacker is to remove at least part of the potting compound 3, for example by drilling open or by chemical dissolving. As a result of the potting compound 3 being drilled open or dissolved, the physical properties of the potting compound 3 and of the electrical lines 3a embedded in the potting compound 3 may be changed in an irreparable and non-reproducible manner. For this purpose, the tamper protection device 4 checks, for example at regular intervals, whether the physical properties of the potting compound 3, in particular, whether the resistance of the electrical lines 3a arranged in the potting compound 3 still correspond to the stored physical fingerprint.

If the potting compound 3 is drilled open, the physical fingerprint may be changed. This change may be detected by the tamper protection device 4 and is transmitted to a control center connected to the interface 9, with the result that said control center recognizes that the field device 1 has been manipulated and enables suitable measures by virtue of the control center outputting a corresponding signal to a user of the control center, for example, with the result that the user may send a team of service personnel to the field device 1 in order to check the state of the field device 1 in situ and to replace the field device 1 if necessary.

Figure 2:
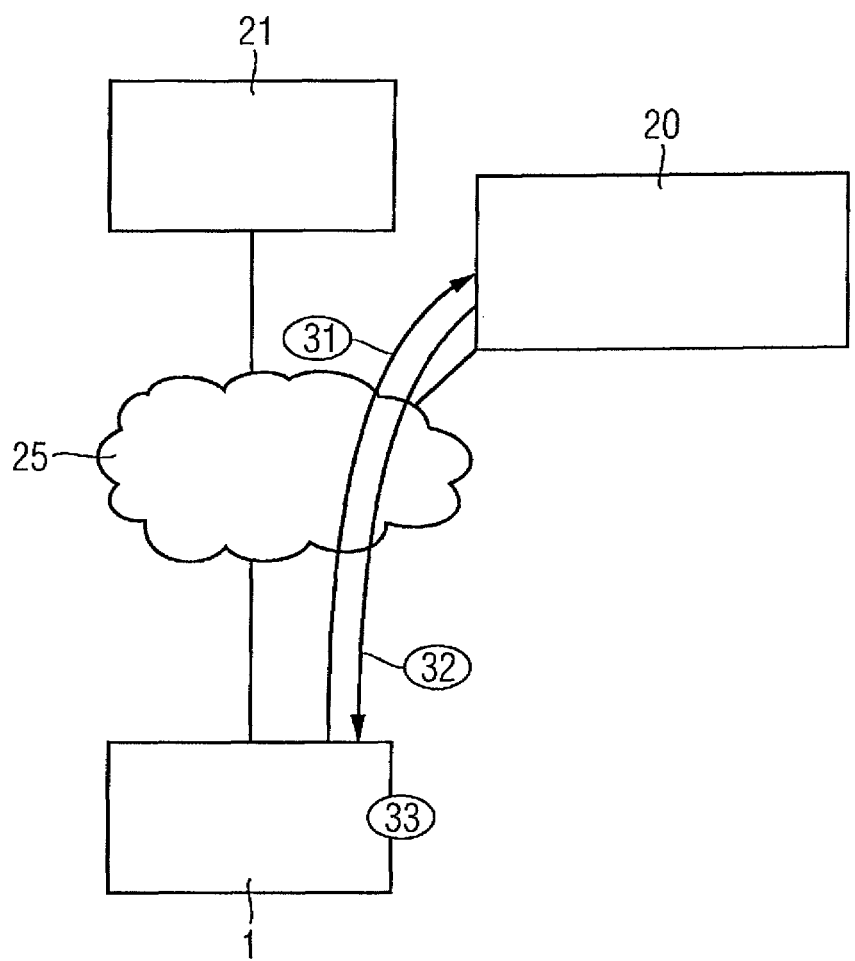
FIG. 2 depicts a flowchart of a method according to an embodiment.

In FIG. 2, the field device 1 is connected to a signal tower 21 via a network 25. In this case, the field device 1 may be in the form of a signal, points or a barrier of a railroad automation system. The field device 1 interchanges control data in encrypted form with the signal tower 21 via the network 25. The field device 1 may also be in the form of a field device in energy automation, process automation and/or pipeline monitoring, for example.

In order to carry out a so-called bootstrapping process with the field device 1, a security configuration may be requested from a bootstrapping server 20 in act 31. For this purpose, the field device 1 may be authenticated with respect to the bootstrapping server 20 by a predefined field device security key. Communication between the bootstrapping server 20 and the field device 1 may be effected in this case in protected form using SSL or TLS, for example.

The bootstrapping server 20 may test the tamper protection of the field device 1 by transmitting control signals and/or an item of characterizing information for the control signals to be used to the field device 1. These control signals are processed in the field device 1, for example by the CPU 5 that controls the tamper protection device 4 in such a manner that test signals are emitted via the contact areas 6a. The test signals transmitted via the contact areas 6a are transmitted back to the bootstrapping server 20 and are compared there with the stored physical fingerprint of the field device 1. If the stored physical fingerprint matches the determined test signals, the field device 1 is provided with a cryptographic key. In act 32, the field device 1 receives the configuration settings and, in particular, at least one configurable security key. The field device 1 stores the received security key in act 33. Encrypted communication between the field device 1 and the signal tower 21 via the network 25, in particular via the Internet, is now possible using the received security key. Control and/or monitoring data may be transmitted in protected form between the field device 1 and the signal tower 21.

In summary, the present embodiments have a plurality of advantages. One advantage is, for example, the fact that tamper protection may thereby be easily provided for a field device. At the same time, a high degree of tamper protection is provided, that enables both passive and active tamper protection of a field device.

Although the present invention was described above using exemplary embodiments, it is not restricted thereto but rather may be modified in various ways.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for testing tamper protection of a field device, the method comprising:
    arranging at least one test element in a sheath of an area of the field device to be protected;
    applying, via at least one contact area of the field device, a first test signal to the at least one test element;
    measuring the first test signal in order to determine a physical fingerprint of the sheath, the physical fingerprint of the sheath being at least partially defined by the arrangement of the at least one test element in the sheath of the area of the field device to be protected;
    storing the physical fingerprint;
    applying, via the at least one contact area, a second test signal to the test element;
    measuring the second test signal;
    comparing the second test signal with the physical fingerprint; and
    outputting, by the field device, a tamper signal indicating the physical fingerprint is changed when the second test signal differs from the physical fingerprint.

2. The method as claimed in claim 1, wherein at least one test element is arranged inside the sheath by a random process or a pseudorandom process.

3. The method as claimed in claim 1, wherein the first test signal, the second test signal, or the first test signal and the second test signal are provided in the form of a galvanic signal, a magnetic signal, an optical signal, a thermal signal, an electrical signal, an electromagnetic signal, or any combination thereof.

4. The method as claimed in claim 1, wherein an item of information relating to the physical fingerprint is stored on the field device, in a database, or on the field device and in the database.

5. The method as claimed in claim 1, wherein the sheath is produced by potting.

6. The method as claimed in claim 1, wherein the sheath is produced in layers.

7. The method as claimed in claim 1, wherein the at least one test element includes magnetic particles, electrical particles, dielectric particles, or any combination thereof.

8. The method of claim 7, wherein arranging the at least one test element in the sheath of the area of the field device to be protected comprises injecting the magnetic particles, the electrical particles, the dielectric particles, or the combination thereof into a still liquid potting compound of the sheath in different directions, at different speeds, or in different directions and at different speeds.

9. The method of claim 1, wherein arranging the at least one test element in the sheath of the area of the field device to be protected comprises arranging different test elements of the at least one test element within different layers of the sheath, respectively.

10. A field device having tamper protection, the field device comprising:
    a sheath;
    at least one test element that is arranged in the sheath;
    at least one test device for emitting, receiving, or emitting and receiving a test signal for the at least one test element; and
    at least one interface for transmitting the test signal,
    wherein the at least one test device is configured to compare a second test signal with a physical fingerprint of the sheath, the physical fingerprint of the sheath being at least partially defined by a first test signal and the arrangement of the at least one test element in the sheath of the field device, wherein the field device outputs a tamper signal when the second test signal differs from the physical fingerprint, the tamper signal indicating the physical fingerprint is changed.

11. The field device as claimed in claim 10, wherein a plurality of test elements are randomly arranged inside the sheath using a predefined random process or pseudorandom process.

12. The field device as claimed in claim 10, wherein the at least one test element is in the form of at least one electrical line.

13. The field device as claimed in claim 10, wherein the test device comprises at least one contact element that is configured to interact with the test element in order to determine the physical fingerprint.

* * * * *